US010378564B2

(12) United States Patent
Baltes et al.

(10) Patent No.: US 10,378,564 B2
(45) Date of Patent: Aug. 13, 2019

(54) DAMPING DEVICE

(71) Applicants: HYDAC TECHNOLOGY GMBH, Sulzbach/Saar (DE); AIRBUS OPERATIONS GMBH, Hamburg (DE)

(72) Inventors: Herbert Baltes, Losheim (DE); Peter Kloft, Ransbach-Baumbach (DE); Robert Marinus Behr, Weyhe (DE); Frank Thielecke, Buxtehude (DE); Arne Waitschat, Hamburg (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 15/556,325

(22) PCT Filed: Feb. 19, 2016

(86) PCT No.: PCT/EP2016/000302
§ 371 (c)(1),
(2) Date: Sep. 7, 2017

(87) PCT Pub. No.: WO2016/142033
PCT Pub. Date: Sep. 15, 2016

(65) Prior Publication Data

US 2018/0094657 A1 Apr. 5, 2018

(30) Foreign Application Priority Data

Mar. 10, 2015 (DE) ........................ 10 2015 003 016

(51) Int. Cl.
*F16L 55/04* (2006.01)
*F15B 21/00* (2006.01)
(Continued)

(52) U.S. Cl.
CPC ............ *F15B 21/008* (2013.01); *F15B 21/00* (2013.01); *F16L 55/027* (2013.01);
(Continued)

(58) Field of Classification Search
CPC .............. F15B 21/008; F16L 55/02736; F16L 55/02754; F16L 55/027; F16L 55/033; F16L 55/05; F16L 55/041
(Continued)

(56) References Cited

U.S. PATENT DOCUMENTS 2,916,101 A 12/1959 Naman
3,141,520 A * 7/1964 Kurtze .............. F16L 55/02754 181/247
(Continued)

FOREIGN PATENT DOCUMENTS

CN 203 374 996 1/2014
DE 30 44 910 7/1982
(Continued)

OTHER PUBLICATIONS

International Search Report (ISR) dated Apr. 29, 2016 in International (PCT) Application No. PCT/EP2016/000302.

*Primary Examiner* — James F Hook
(74) *Attorney, Agent, or Firm* — Wenderoth, Lind & Ponack, LLP.

(57) ABSTRACT

A damping device, in particular for damping or avoiding pressure surges, such as pulses, in hydraulic supply circuits, preferably in the form of a silencer, has a damping housing surrounding a damping chamber and having a fluid inlet (3) and a fluid outlet (5). A fluid receiving chamber (7) extends between the fluid inlet and the fluid outlet. A fluid flow crosses the damping chamber in a throughflow direction (11) from the fluid inlet (3) to the fluid outlet (5). Parts of the fluid receiving chamber (7) extend transversely with respect to
(Continued)

the throughflow direction (11). The fluid receiving chamber (7) immediately adjoins the fluid inlet (3) and the fluid outlet (5). A guide element (51) is provided in the damping chamber. The fluid flow flows against the guide element changing the flow speed of the flow at least in sections.

16 Claims, 5 Drawing Sheets

(51) Int. Cl.
*F16L 55/027* (2006.01)
*F16L 55/05* (2006.01)
*F16L 55/033* (2006.01)

(52) U.S. Cl.
CPC ....... *F16L 55/02754* (2013.01); *F16L 55/033* (2013.01); *F16L 55/04* (2013.01); *F16L 55/041* (2013.01); *F16L 55/05* (2013.01)

(58) Field of Classification Search
USPC ............................................. 138/26, 39, 42
See application file for complete search history.

(56) References Cited

U.S. PATENT DOCUMENTS

| | | | | | |
|---|---|---|---|---|---|
| 3,150,689 | A * | 9/1964 | Lieberman | F04D 29/66 | 138/26 |
| 4,163,461 | A * | 8/1979 | Jacobellis | F16L 55/053 | 138/30 |
| 4,897,906 | A * | 2/1990 | Bartholomew | F16L 55/05 | 138/26 |
| 6,848,477 | B2 * | 2/2005 | Treusch | F02M 37/0017 | 123/456 |
| 6,901,964 | B2 * | 6/2005 | Kippe | F16L 55/053 | 123/467 |
| 9,863,568 | B2 * | 1/2018 | Novellani | F02M 37/0041 | |
| 2003/0221904 | A1 * | 12/2003 | Ludwig | F16L 55/02736 | 181/224 |
| 2007/0034444 | A1 * | 2/2007 | Yaoita | F01N 1/06 | 181/224 |
| 2009/0269219 | A1 * | 10/2009 | Langbein | A47L 9/0081 | 417/312 |
| 2010/0288388 | A1 * | 11/2010 | Barale | B62D 5/062 | 138/31 |

FOREIGN PATENT DOCUMENTS

| | | |
|---|---|---|
| DE | 102 17 080 | 8/2003 |
| DE | 10 2009 046 578 | 5/2011 |
| DE | 20 2014 006 687 | 10/2014 |

* cited by examiner

DAMPING DEVICE

FIELD OF THE INVENTION

The invention relates to a damping device, in particular for damping or avoiding pressure surges, such as pulsations, in hydraulic supply circuits, preferably in the form of a silencer. The damping device has a damping housing surrounding a damping chamber and having at least one fluid inlet, at least one fluid outlet and a fluid receiving chamber extending between the fluid inlet and the fluid outlet. During operation of the device, a fluid flow crosses the damping chamber in a throughflow direction, coming from the fluid inlet in the direction of the fluid outlet. At least parts of the fluid receiving chamber extend in at least one extension direction transversely with respect to the throughflow direction.

BACKGROUND OF THE INVENTION

Damping devices of this kind are state of the art. Such hydraulic dampers, which are also referred to as sound dampers or silencers, serve to reduce oscillations repeatedly generated by pressure pulsations in an attached hydraulic system, in particular due to the operation of hydraulic pumps. As is disclosed in DE 102 17 080 C1, the known damping devices of this kind have a damping housing in the form of a circular cylinder, which is rounded in a spherical manner at both axial end regions. The fluid inlet and the fluid outlet are located coaxial to the cylinder axis on a respective end region. As the damping chamber, which the fluid flow crosses from the fluid inlet to the fluid outlet, a damping tube is provided in such damping devices and extends coaxially between the fluid inlet and the fluid outlet. The tube wall has openings to the fluid chamber surrounding the tube. According to the cylinder diameter, the fluid chamber is radially expanded relative to the axial throughflow direction defined by the damping tube.

SUMMARY OF THE INVENTION

On the basis of this prior art, the problem addressed by the invention is to provide a damping device of the type considered, which, while having a simple construction, is distinguished by an advantageous operational behavior.

According to the invention, this problem is basically solved by a damping device having, as a significant distinguishing feature of the invention, a fluid receiving chamber that immediately adjoins the fluid inlet and the fluid outlet and having a guide element provided in the damping chamber. The fluid flows on the guide element to change the flow speed of the flow in regions. Due to the direct connection of the fluid receiving chamber to the fluid inlet or fluid outlet and the resulting omission of a damping tube, the device according to the invention is firstly distinguished by a simplified construction. In damping devices of this kind with a fluid receiving chamber extending transversely relative to the throughflow direction (the disk silencers) the flow speed behavior inside the fluid receiving chamber has a significant influence on the damping performance. The guide element onto which fluid can flow that is provided according to the invention makes it possible to partially accelerate the flow. By contrast with a free throughflow from the fluid inlet to the fluid outlet, a flow speed favoring damping efficiency can then be achieved, including in the side regions of the fluid receiving chamber. Installation parts serving as the guide element can have any geometrical shape whatsoever, which produce a partial acceleration of the flow without an excessive increase in the flow resistance.

In particularly advantageous exemplary embodiments, the fluid receiving chamber is formed by a cavity in the form of a disk with two boundary walls that extend parallel to one another and determine the thickness of the disk. The guide element extends in a continuous manner from one boundary wall to the other boundary wall. The disk-shaped cavity can advantageously be formed cylindrical or as a polygon, or can have any other shape differing from the circular shape.

The arrangement can particularly advantageously be such that parts of the fluid inlet and of the fluid outlet extend in alignment with the boundary walls in the damping housing. In such an arrangement, the fluid inlet and fluid outlet formed as damping housing bores can have an identical diameter, with that diameter corresponding to the spacing between the two boundary walls.

The guide element can particularly advantageously be arranged in a position aligned with the housing axis extending from the fluid inlet to the fluid outlet, with the guide element preferably being arranged at least approximately in the region of half of the length of the housing axis extending from the fluid inlet to the fluid outlet.

In particularly advantageous exemplary embodiments, the guide element is formed as a flow divider with guide surfaces that extend to both sides from a narrow onflow region facing the fluid inlet and being located on the housing axis. This arrangement makes it possible to realize flow speeds that are favorable to the damping effect even in the outer regions of the disk-shaped cavity that are distanced from the longitudinal axis.

The damping housing can particularly advantageously be formed in several pieces,

- with a pot-shaped base part that has a disk-shaped central recess forming part of the cavity with the one boundary wall and the fluid inlet and the fluid outlet, and
- with a flange-shaped cover part that, with the other boundary wall as part of an engagement piece, engages in a flush manner in the central recess when the cover part is fixed to the base part.

The guide element is preferably formed integral with the cover part in such a way that it projects from the boundary wall formed on the engagement piece.

For the purpose of sealing the cavity relative to the environment, a sealing device can be arranged on the engagement piece of the cover part, which sealing device is in particular in the form of a sealing ring inserted in a circumferential groove. The sealing ring forms a seal at the central recess of the pot-shaped base part.

For a pressure-tight formation of the damping housing, the cover part can have, lying opposite diametrical to its vertical axis, several penetration bores. The bores are penetrated by fixing screws to fix the cover part to the base part. The arrangement can advantageously be such that the fixing screws, while leaving the region of the fluid inlet and the fluid outlet free, are arranged uniformly along an external circumference on the damping housing, which surrounds the disk-shaped fluid receiving chamber. The damping housing can then be designed for reliable operation at a high pressure level, for example, in the range of 200 bar.

For the connection to a corresponding hydraulic system, a receptacle for a sealing ring can be provided at the fluid inlet and/or at the fluid outlet in the damping housing. The sealing ring surrounds the fluid inlet and/or the fluid outlet. In the manner of a fixing block, the damping housing can be fixed to third components by several fixing bolts, which surround the region of the fluid inlet and/or of the fluid outlet.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
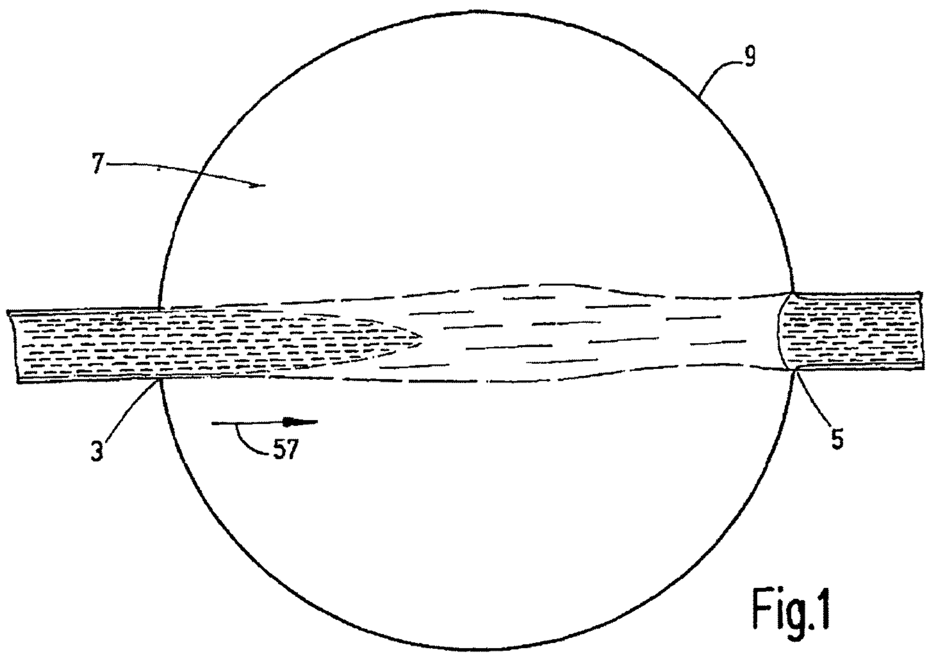
FIG. 1 is a simplified top plan view in sketch-type depiction of the main course of the fluid flow in the fluid receiving chamber of a damping device in the form of a disk silencer.

With reference to the attached drawings, the invention is explained on the basis of the example of a disk silencer, the basic construction of which corresponds to subsequently published prior art, as is described in the patent application DE 10 2014 005 822.0. Inside the damping housing of that silencer, the damping housing is sealed in a tight manner relative to the environment except for a fluid inlet 3 and a fluid outlet 5. The silencer has as a damping chamber a fluid receiving chamber immediately adjoining the fluid inlet 3 and the fluid outlet 5. The fluid receiving chamber is formed by a cavity 7 in the form of a flat circular disk, with only the circular contour thereof being shown and identified with the reference numeral 9 in the simplified, sketch-type depictions of FIGS. 1 and 2. As can be seen, the fluid inlet 3 and the fluid outlet 5 are diametrically opposite one another, with the housing axis 11 extending between the fluid inlet 3 and the fluid outlet 5 corresponding to the throughflow direction of the fluid flow.

Figure 3:
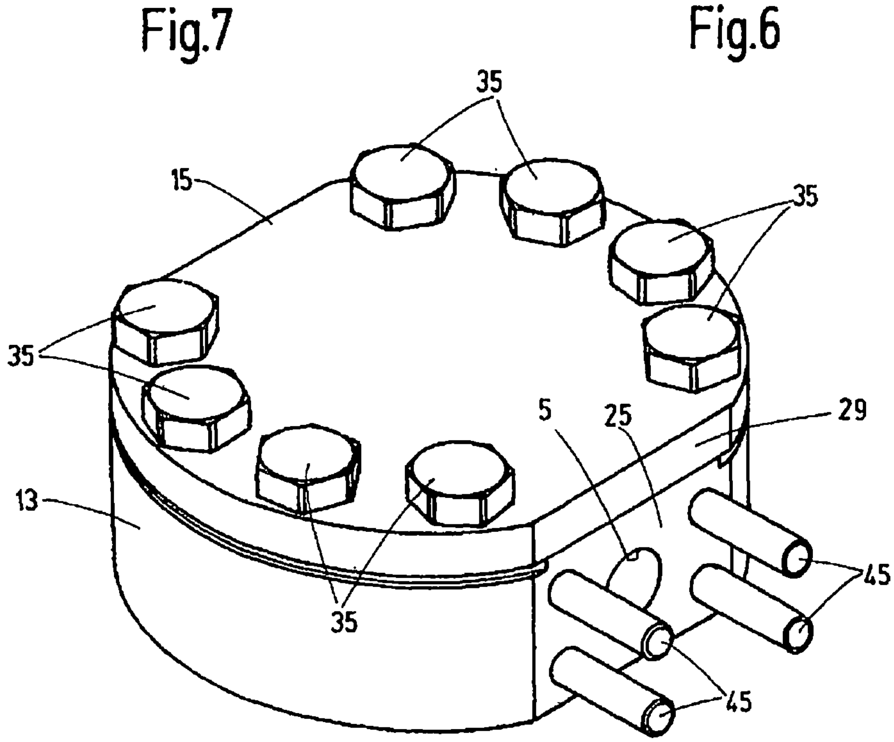
FIG. 3 is a perspective view, depicted at approximately half the size of a practical embodiment of a damping device, according to an exemplary embodiment of the invention.
Figure 4:
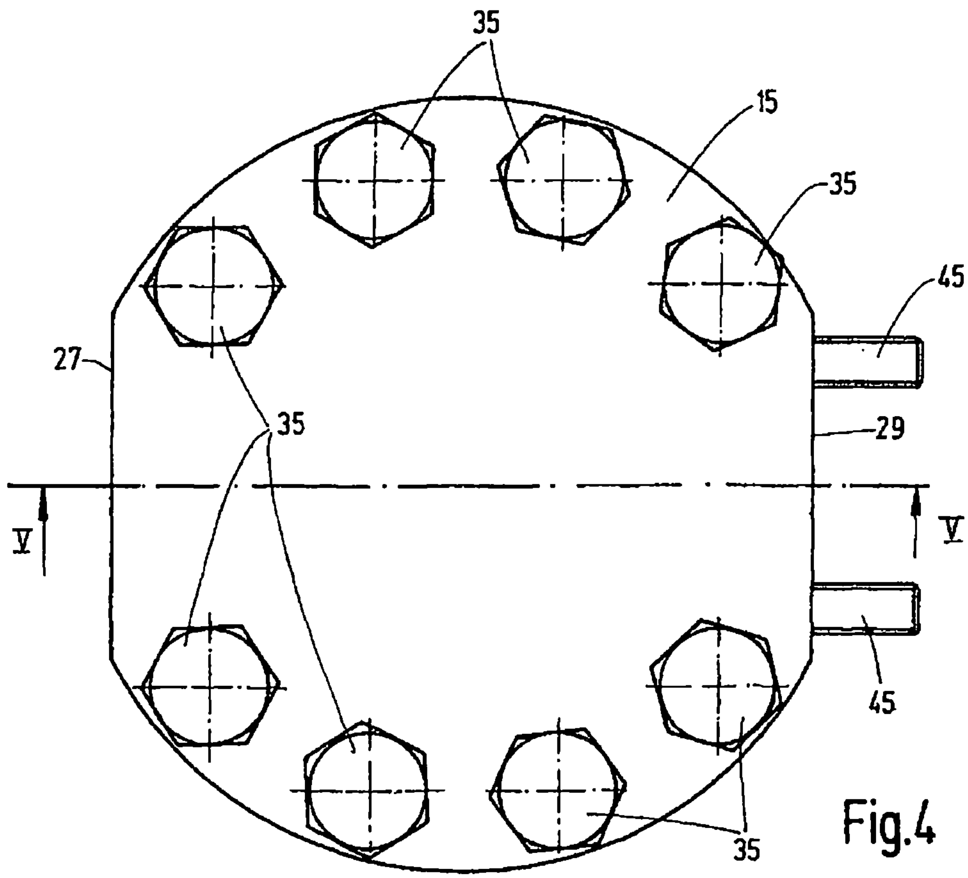
FIG. 4 is a top view of the exemplary embodiment of the damping device of FIG. 3.
Figure 5:
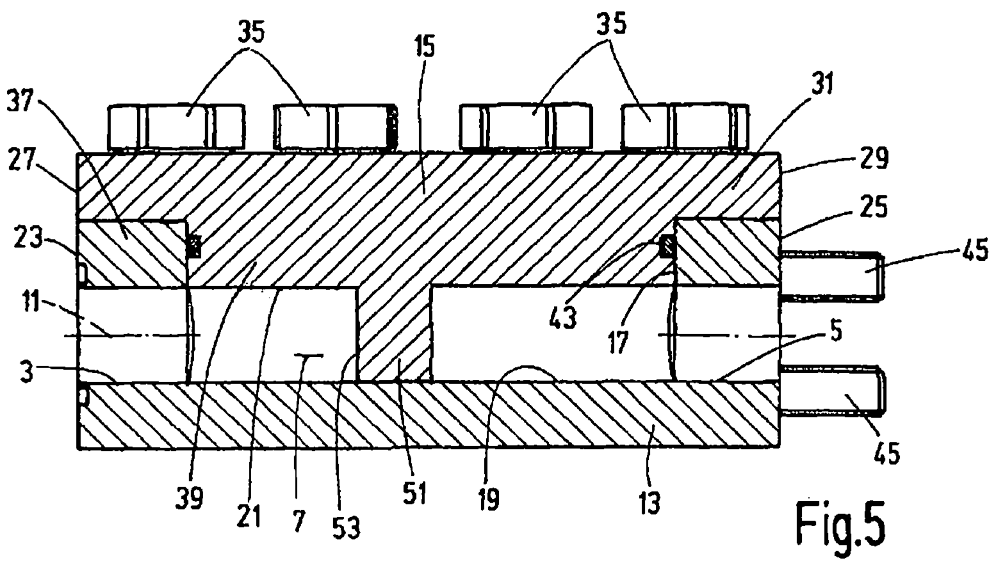
FIG. 5 is a side view in section of the exemplary embodiment taken along line V-V of FIG. 4.

As can be seen most clearly from FIGS. 3 and 5, the damping housing is formed from two main parts, namely, a base part 13 and a cover part 15. In order to form the disk-shaped cavity 7, the base part 13 has a central recess 17 in the form of a pot. The flat base surface of base part 13 forms the bottom or base boundary wall 19 of the disk-shaped cavity 7. The top or cover boundary wall 21 determining the thickness of the disk, which extends in a parallel plane to the bottom boundary wall 19, is located at the bottom side of the cover part 15. The fluid inlet 3 and the fluid outlet 5 are aligned with the boundary walls 19 and 21, so that the diameter of the fluid inlet 3 and the fluid outlet 5 respectively corresponds to the disk thickness of the cavity 7. At the fluid inlet 3 and at the fluid outlet 5, the base part 13 has a respective flattening 23 and 25, between which the outer wall of the base part 13 extends in a circular arc shape. The cover part 15 has the same external circumference shape as the base part 13. Like the base part 13, the cover part 15 has opposite flattenings 27 and 29, between which the external circumference likewise extends in a circular arc shape. When the cover part 15 is mounted on the base part 13, a step-free outer contour of the damping housing is then formed, as FIG. 3 shows.

Figure 8:
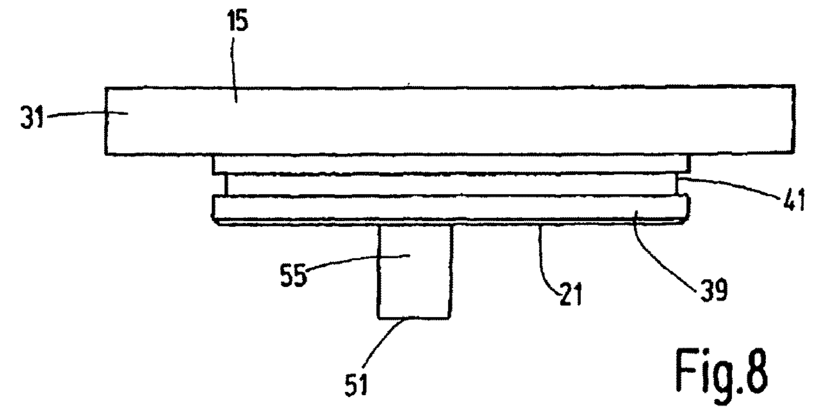
FIG. 8 is a side view of the cover part of the damping housing of the exemplary embodiment.
Figure 9:
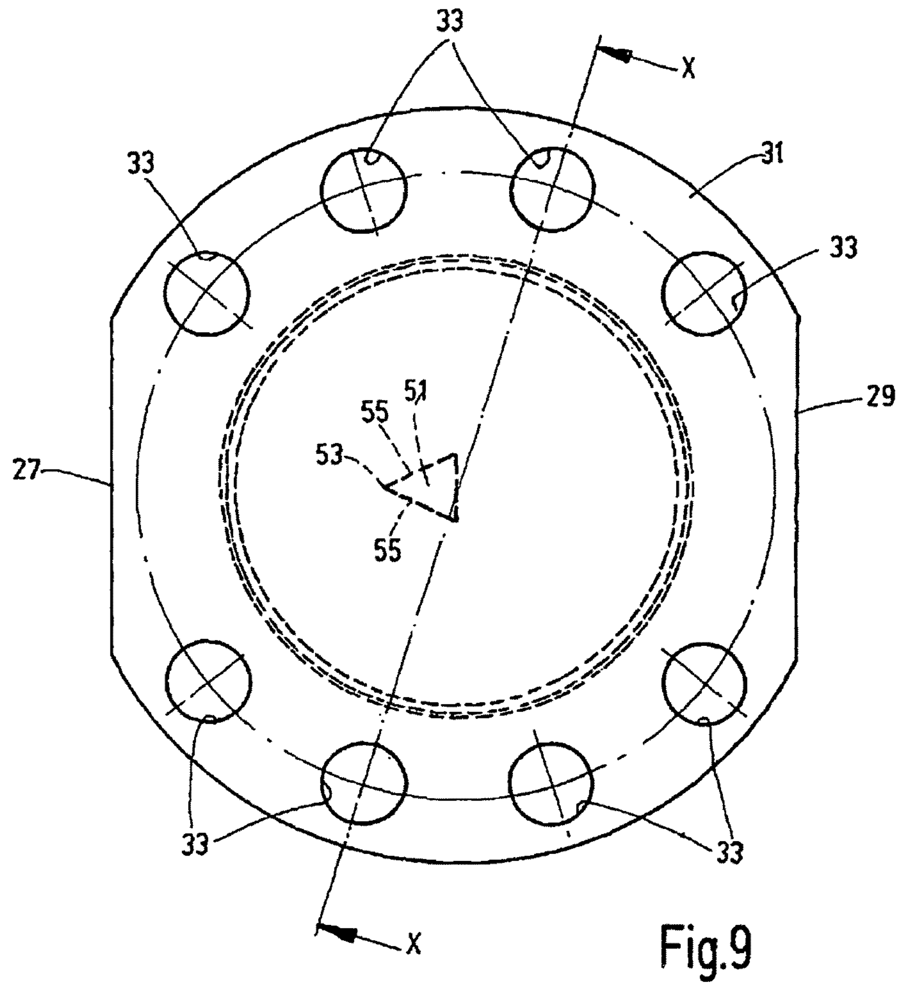
FIG. 9 is a top view of the cover part of FIG. 8.
Figure 10:
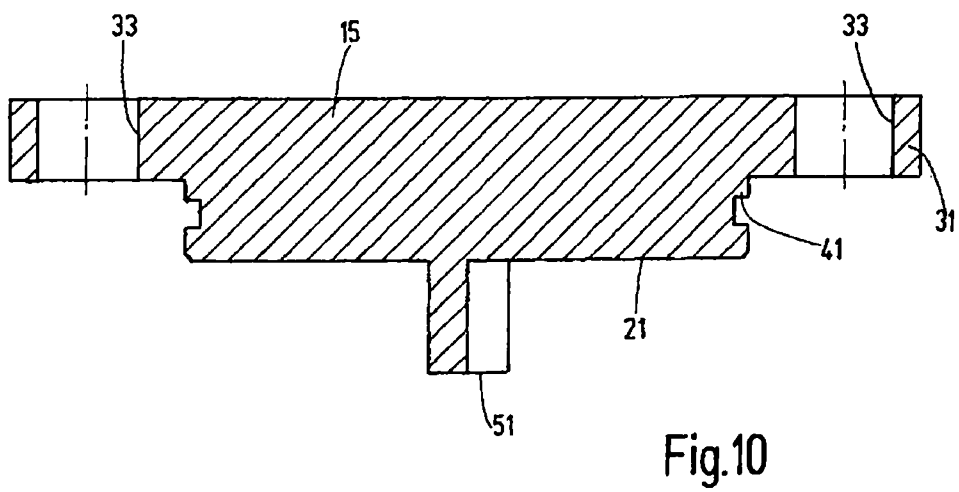
FIG. 10 is a side view in section of the cover part of FIG. 8, taken along line X-X of FIG. 9.

As is shown by FIG. 5 and by FIGS. 8 and 9, the cover part 15 has a flange part 31 with fixing holes 33. These holes 33 are arranged, as FIG. 9 shows, on a partial circular arc outside of the region of the flattenings 27 and 29. In correspondence with the fixing holes 33, threaded bores are provided in the base part 13 as blind holes for fixing screws 35 by which the cover part 15 can be fixed to the base part 13 in such a way that the flange part 31 of the cover part 15 overlaps the circumferential edge 37 of the central recess 17 of the base part 13. A circular engagement piece 39 extending downwards from the flange part 31 engages in a fitting manner into the central recess 17 of the base part 13. This engagement is depicted in the screwed state in FIG. 5. For the purpose of sealing the cavity 7 relative to the cover part 15, a sealing ring 43 is used in an annular groove 41 incorporated into the side wall of the engagement piece 39.

For the attachment of the damping housing to corresponding third components, in the depicted exemplary embodiment, threaded bolts 45 are provided on the flattening 25 of the base part 13 comprising the fluid outlet 5, which threaded bolts are arranged symmetrical to the fluid outlet 5. In addition, a receiving groove 47 for a sealing ring is formed on the opposite flattening 23 at the fluid inlet 3. Fixing bores 49 are also arranged on this flattening 23 for the formation of coupling connections, which fixing bores are in a symmetrical arrangement relative to the fluid inlet 3. In a corresponding manner, a sealing arrangement can be provided on the flattening 25 assigned to the fluid outlet 5. The symmetrical housing construction also allows the interchanging of the inlet side and the outlet side, potentially with changed sealing geometries.

Figure 2:
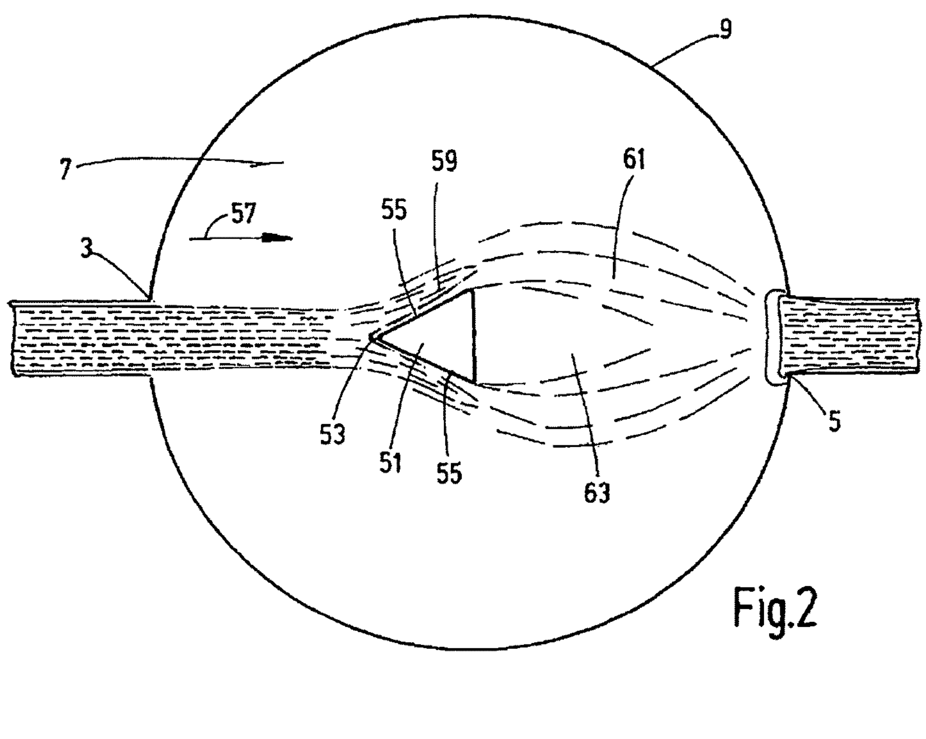
FIG. 2 is a simplified top plan view in a sketch-type depiction of a damping device according to the invention.
Figure 7:
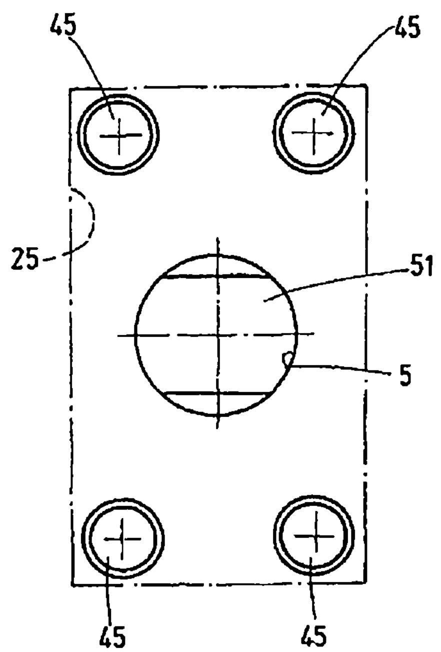
FIG. 7 is a partial side view of only the fluid inlet-comprising connection region of the damping housing of the exemplary embodiment.
Figure 6:
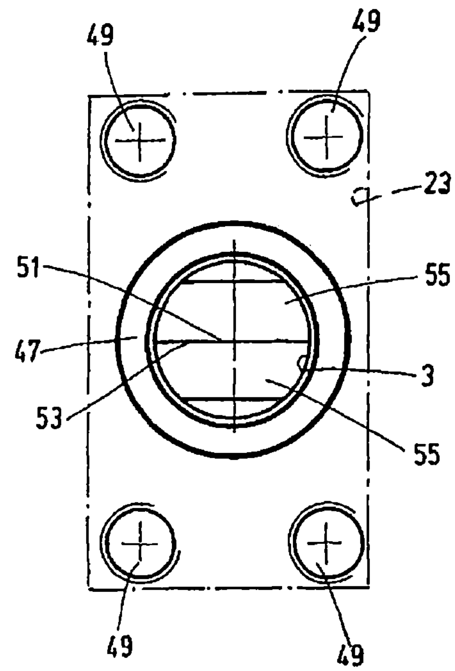
FIG. 6 is a partial side view of only the fluid outlet-comprising connection region of the damping housing of the exemplary embodiment.
Figure 11:
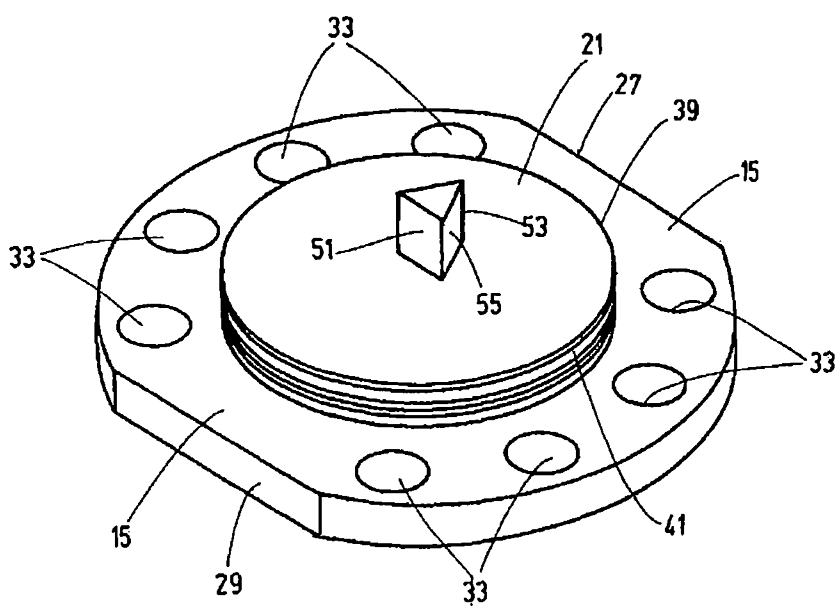
FIG. 11 is a perspective oblique view of the cover part of FIG. 8 seen on the bottom side thereof.

To the extent described above, the exemplary embodiment of the damping device corresponds to the disk silencer as is disclosed as subsequently published prior art in the above-mentioned patent application DE 10 2014 005 822.0. The essential difference of the present invention compared thereto is that a flow guide element 51 is arranged in the disk-shaped cavity 7 forming the fluid receiving chamber. As can be most clearly seen from FIGS. 2, 9 and 11, the flow guide element 51 has a wedge shape such that, starting from a narrow onflow region 53 forming a wedge tip, guide surfaces 55 are formed, which guide surfaces diverge in the throughflow direction indicated with the arrow 57. The guide element 51 then forms a flow divider for a flow course, as indicated in FIG. 2 in a schematically simplified manner, with side zones 59, in which the flow is partially accelerated, and zones 61 and 63 with comparatively lesser flow speed.

The guide element 51 is formed integrally with the cover part 15 as a projection, which protrudes from the boundary wall 21 on the engagement piece 39. The height of the projection corresponds to the disk thickness of the disk-shaped cavity 7, so that the guide element 51 extends from the boundary wall 21 of the cover part 15 in a continuous manner up to the boundary wall 19 on the base part 13. The guide element 51 is centrally arranged in the cavity 7, so that the pointed onflow region 53 is situated on the housing axis 11 that extends from the fluid inlet 3 to the fluid outlet 5 approximately at half the length of axis 11 between the inlet 3 and the outlet 5. Instead of the wedge shape shown in the present example, a different shape can be provided for the guide element 51, with which the guide surfaces produce a flow profile that is suitable for high-efficiency damping in the disk-shaped cavity 7 without having an adverse effect on the flow resistance.

Instead of the depicted integral formation of the guide element 51 as a projection on the boundary wall 21 of the cover part 15, a separate installation part can be provided as the guide element. Furthermore, more than one guide element could be provided, which could potentially have different shapes and sizes. The depicted positioning of the guide element 51 on the housing axis 11 is also not mandatory.

While one embodiment has been chosen to illustrate the invention, it will be understood by those skilled in the art that various changes and modifications can be made therein without departing from the scope of the invention as defined in the claims.

The invention claimed is:

1. A damping device for damping pressure surges in hydraulic circuits, the damping device comprising:

a damping housing surrounding a damping chamber and including a fluid inlet, a fluid outlet and a fluid receiving chamber extending between said fluid inlet and said fluid outlet and forming said damping chamber, parts of said fluid receiving chamber extending in a direction transverse relative to a flow through direction from said fluid inlet to said fluid outlet, said fluid receiving chamber immediately adjoining said fluid inlet and said fluid outlet, said damping housing including a pot-shaped base part and a flange-shaped cover part, said base part having a disk-shaped central recess forming said fluid receiving cavity and having a peripheral boundary wall in which said fluid inlet and said fluid outlet extend, said cover part engaging and being fixed to said boundary wall of said base part and having an engagement piece extending into said central recess in a flush manner; and a guide element being in said damping chamber, being formed integrally with said cover part and projecting from a cover boundary wall on said engagement piece, said guide element being contacted by fluid flow from said fluid inlet toward said fluid outlet in said damping chamber and changing speed of the fluid flow in regions of said damping chamber.

2. A damping device according to claim 1 wherein said base part having a base boundary wall extending parallel to said cover boundary wall to define a thickness of said fluid receiving chamber between said fluid inlet and said outlet, said guide element extending continuously from said cover boundary wall to said base boundary wall.

3. A damping device according to claim 2 wherein opposite transverse cross-sectional portions of said fluid inlet and said fluid outlet are axially aligned with respective planes of said cover boundary wall and said base boundary wall, said fluid inlet and said fluid outlet having equal cross-sectional diameters equal to a distance between said cover boundary wall and said base boundary wall.

4. A damping device according to claim 3 wherein said fluid inlet and said fluid outlet are damping housing bores with identical diameters.

5. A damping device according to claim 1 wherein said disk-shaped central recess is cylindrical or polygonal.

6. A damping device according to claim 1 wherein said guide element is in a position aligned with a housing axis extending from said fluid inlet to said fluid outlet.

7. A damping device according to claim 6 wherein said guide element is located approximately one-half of a length of said housing axis from said fluid inlet to said fluid outlet.

8. A damping device according to claim 6 wherein said guide element is a flow divider having guide surfaces extending from both sides of a narrow region of said guide element facing said fluid inlet and located on said housing axis.

9. A damping device according to claim 1 wherein a seal is between and engages said engagement piece of cover part and said peripheral wall of said base part sealing said fluid receiving cavity relative to a surrounding environment of said damping housing.

10. A damping device according to claim 9 wherein said seal comprises a sealing ring inserted in a circumferential wall of one of said engagement piece and said peripheral wall.

11. A damping device according to claim 1 wherein said cover part comprises multiple through bores radially spaced from a central axis of said damping chamber; and fixing screws extend through said bores and engage said base part affixing said cover part and said base part.

12. A damping device according to claim 11 wherein said fixing screws are disposed uniformly along an external circumference of said damping housing, said external circumference surrounding said damping chamber while leaving areas of said fluid inlet and said fluid outlet exposed.

13. A damping device according to claim 1 wherein said fluid inlet comprises a seating receiving a sealing ring surrounding said fluid inlet; and said fluid outlet comprises a seating receiving a sealing ring surrounding fluid outlet.

14. A damping device according to claim 1 wherein at least one of said fluid inlet or said fluid outlet has fixing bolts in a surrounding area thereof making said damping housing affixable to another component.

15. A damping device according to claim 1 wherein said guide element tapers toward a narrow region of said guide element facing said fluid inlet and located on a housing axis extending between center axes of said fluid inlet and said fluid outlet.

16. A damping device according to claim 15 wherein said guide element comprises planar side surfaces extending from said narrow region.

* * * * *